Patented Feb. 9, 1937

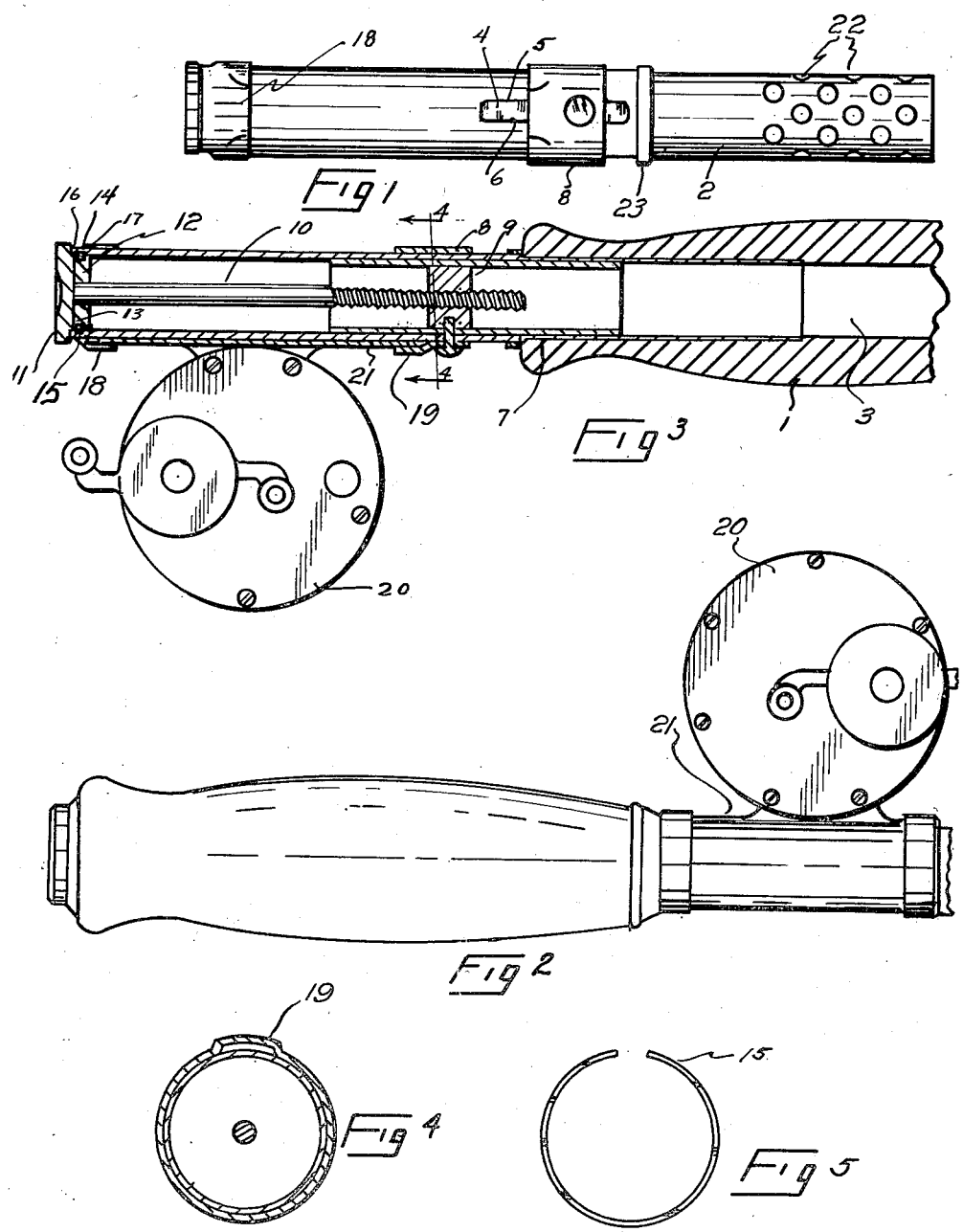

2,069,977

UNITED STATES PATENT OFFICE 2,069,977

REEL LOCK

Cloise C. Spencer, Portland, Oreg.

Application October 15, 1934, Serial No. 748,290

1 Claim. (Cl. 43—22)

My invention relates to attachments for fishing poles and the like, the primary purpose and object being to facilitate the attaching of the fishing reel to the pole and for detaching the same therefrom and for securing the same thereto in a rigid manner.

The invention in its preferred embodiment is comprised of a shank having a threaded stem running longitudinally thereof and having a fixed clamping head and a movable clamping head disposed thereupon. The movable clamping head is adapted for being moved by a threaded member disposed within the shank and to which it is indirectly attached by a running nut to place the same in and out of locking engagement with the fishing reel.

The primary purpose and object of my invention consists in providing a locking means for securing a fishing reel to a fishing pole.

A further object of my invention consists in providing means for locking a fishing reel to a fishing pole which means will not interfere with the casting facilities of the pole and one that will not interfere with the free use of the fishing pole.

Still further objects of my invention consist in providing a reel attaching device that is light in weight, one that is comprised of few parts and one that may be used over a long period with practical freedom from mechanical annoyances.

With these and incidental objects in view, the invention consists in certain novel features of construction and combination of parts, the essential elements of which are set forth in the appended claim, and a preferred embodiment of which is hereinafter shown with reference to the drawing which accompanies and forms a part of this specification.

In the drawing:

Fig. 1 is a top plan view of the assembled device shown removed from a fishing pole.

Fig. 2 is a side view of one of my new and improved devices shown attached to a fishing rod and being attached between the handle of the pole and the fishing rod.

Fig. 3 is a sectional view of one of my new and improved devices shown attached to the outer end of the handle of the fishing pole.

Fig. 4 is a sectional view of the mechanism illustrated in Fig. 3. This view is taken on line 4—4 of Fig. 3 looking in the direction indicated.

Fig. 5 is a plan view of the locking ring that is used for locking the bearing and the threaded stem in place within the shank of the device.

Like reference characters refer to like parts throughout the several views.

I have here shown my device being in place and in position and also shown the same as having been removed from the handle 1 of the fishing rod. My device is comprised of a shank 2. The shank 2 is preferably made of tubular material that is light in weight, that is durable, preferably made of noncorrodible metal, and one that may be made to precisely fit within the cylindrical bore 3 that extends longitudinally of the handle 1. A slot 4 is disposed within and extends through the cylindrical wall of the shank 2. This slot preferably has parallel sides 5 and 6 and extends longitudinally of the shank.

A sleeve 7 is disposed within the shank and is slidable longitudinally thereof. A locking collar 8 is disposed about the shank and a locking pin disposed through the slot 4 connects the sleeve 7 with the collar 8. A threaded stem 10 runs longitudinally of the shank and the same has an enlarged head 11 disposed upon the outer end. The oppositely disposed end of the stem is in threaded relationship with the nut 9 which is fixedly secured within the sleeve 7.

A bushing 12 is formed integral with the head 11 of the stem 10 and a groove 13 is disposed circumferentially of the outer surface of the bushing 12. A companion groove 14 is formed within the inner surface of the shank 2 and is in registry with the groove 13 when the bushing 12 is inserted in the end of the shank 2. A resilient ring 15 as disclosed in Fig. 5 expands within the respective grooves and maintains the stem assembly in locked relationship within the shank 2.

A wearing ring 16 is disposed between the end of the shank and the enlarged head 11. Since the stem 10 is in threaded relationship with the nut 9, as the stem is turned the nut is moved longitudinally of the shank and simultaneously therewith the locking collar 8 and sleeve 7 are also moved longitudinally of the shank.

A band 17 is secured to the butt end of the shank and a socket 18 is formed between the band and the butt end of the shank to which the same is secured. A similar socket 19 is formed within the collar 8. The reel 20 has a base 21 secured thereto, the oppositely disposed ends of which are adapted to engage within the sockets 18 and 19 and the moving of the collar 8 toward the band 17 securely locks the base 21 about the shank and within the sockets 18 and 19. The turning of the threaded stem 10 in the opposite direction moves the socket 19 from engagement with one end of the base 21 and permits the easy removal of the reel from the pole.

In Figs. 1 and 2, I have shown my assembly as being disposed upon the outer end of the handle 1. It may be placed with equal facility upon the oppositely disposed end of the handle, between the handle and the fishing rod. In the construction illustrated in Fig. 2 the shank 2 and the stem 10 are made sufficiently long to run longitudinally of the handle and to engage the nut disposed within the sleeve as heretofore described.

To facilitate the securing of the shank to the handle especially where the same is made out of cork or other like material, I form a plurality of spaced holes 22 within the shank and the inserting of the same in a driving fit within the cylindrical opening 3 disposed within the handle facilitates attachment thereto. I place a stop ring 23 about the shank to act as a stop when inserting the shank within the handle.

While the form of mechanism herein shown and described is admirably adapted to fulfill the objects primarily stated, it is to be understood that it is not intended to confine the invention to the one embodiment herein shown and described, as it is susceptible of embodiment in various forms, all coming within the scope of the claim which follows.

What I claim is:

The combination with a fishing pole and reel, of a reel lock comprising a hollow shank having a longitudinal slot therein, a sleeve disposed within the shank and adapted for being moved longitudinally therein, a nut fixedly secured within the sleeve, a locking collar having a socket formed therein and being slidably disposed about the shank and fixedly secured to the nut and sleeve, said securing means being disposed through the longitudinal slot in the hollow shank, a stem having an enlarged head disposed within the shank and threadedly attached to the nut, a band disposed about the base end of the shank and having a socket therein, the socket in the locking collar and in the band being adapted to engage the oppositely disposed ends of the base of the reel and means for locking the threaded stem within the shank.

CLOISE C. SPENCER.